Aug. 1, 1961   A. J. VAN AUWELAER ET AL   2,994,446
EARTH MOVING EQUIPMENT
Filed May 11, 1959   2 Sheets-Sheet 1

INVENTORS
ALBERT J. VAN AUWELAER,
OSKAR R. JOHANSSON
BY
ATTORNEYS

Aug. 1, 1961 A. J. VAN AUWELAER ET AL 2,994,446
EARTH MOVING EQUIPMENT
Filed May 11, 1959 2 Sheets-Sheet 2
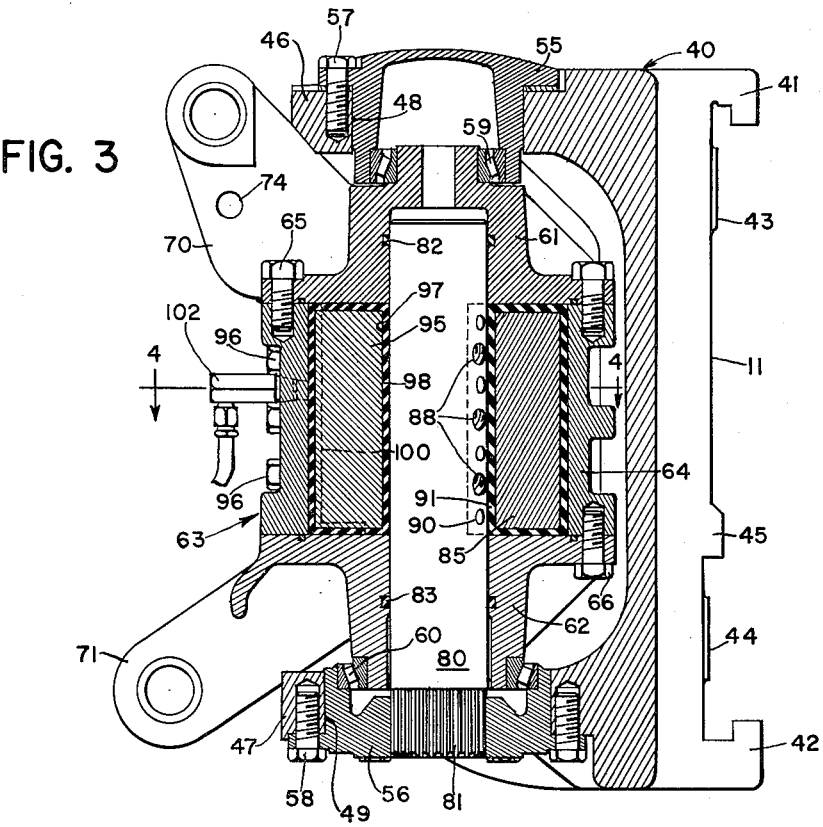
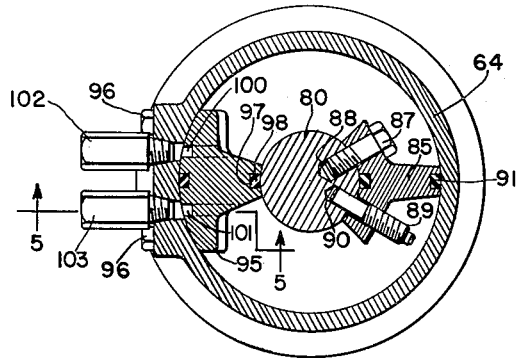
INVENTORS
ALBERT J. VAN AUWELAER,
OSKAR R. JOHANSSON
BY
ATTORNEYS

United States Patent Office 2,994,446
Patented Aug. 1, 1961

2,994,446
EARTH MOVING EQUIPMENT
Albert J. Van Auwelaer and Oskar R. Johansson, East Moline, Ill., assignors to Deere & Company, Moline, Ill., a corporation of Delaware
Filed May 11, 1959, Ser. No. 812,282
7 Claims. (Cl. 214—138)

This invention relates to an earth working implement adapted for mounting on a mobile vehicle. More particularly this invention relates to a type of implement having a boom with earth working equipment at one end and supported on a stand or mounting structure at the opposite end. Still more particularly, this invention is concerned with the supporting connection between the stand and the boom.

In the type of implement generally known in the industry as a backhoe, there is provided conventionally an upright and transverse stand or frame positioned to the rear of a tractor and supported either on the tractor by suspension or in conjunction with legs on the frame which are retractable for transport purposes and which offer stability when the implement is in operation. The boom is mounted on the transverse stand by various types of connecting structure which generally include the type of mechanism permitting vertical swinging of the boom about its connecting point and also to swing laterally about an upright axis. On the outer end of the boom there is provided earth working equipment which includes a dipper stick pivoted for vertical movement on the boom and which carries on its remote end a bucket which serves to both dig the earth and to transport the earth that has been dug. Suitable hydraulic means are provided for both moving the dipper stick relative to the boom and moving the boom vertically.

It is the main object of the present invention to provide a supporting structure between the main stand or frame and the boom of the backhoe which is of a new and novel nature and which is mounted relatively low on the supporting stand so as to give maximum visability from the operator's station.

It is also a main object of the present invention to provide with the supporting structure a locking means which will connect the boom in an upright position so that the boom may be locked for transport purposes.

It is still a further object of the present invention to incorporate into the connecting structure between the boom and the main frame a swiveling action created by the interrelation between an upright columnar member and an associated casing spaced from the columnar member. The casing will normally have rearwardly projecting portions on which the boom is carried. Vane means are provided between the columnar member and the casing so that the casing may be swiveled about the columnar member, which will be fixed against rotation, by hydraulic fluid which is introduced into the chamber between the casing and columnar member.

Other objects and advantages of the present invention will become apparent to those skilled in the art as the nature of the invention is better understood following a full appreciation of the present disclosure and as shown in the accompanying drawings.

FIG. 3 is a vertical sectional view of the swivel structure between the boom of the backhoe and its supporting stand.

FIG. 4 is a sectional view taken substantially along the lines 4—4 of FIG. 3.

FIG. 5 is a sectional view taken substantially along the lines 5—5 of FIG. 4.

Figure 1:
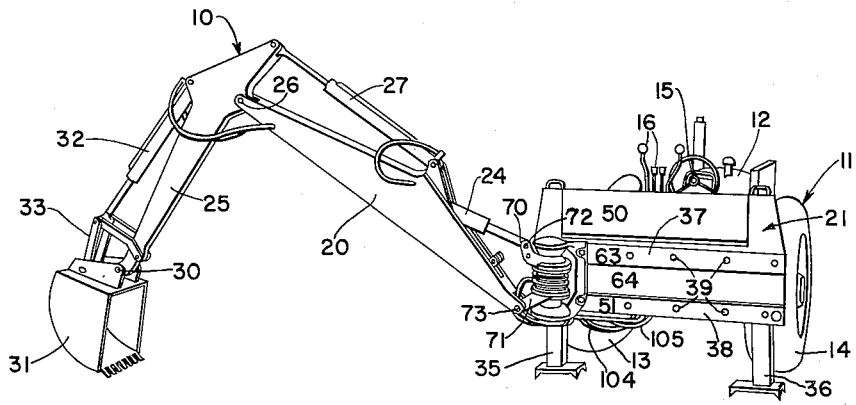
FIG. 1 is a rear perspective view of a backhoe and tractor, the backhoe incorporating the structure of the present invention.
Figure 2:
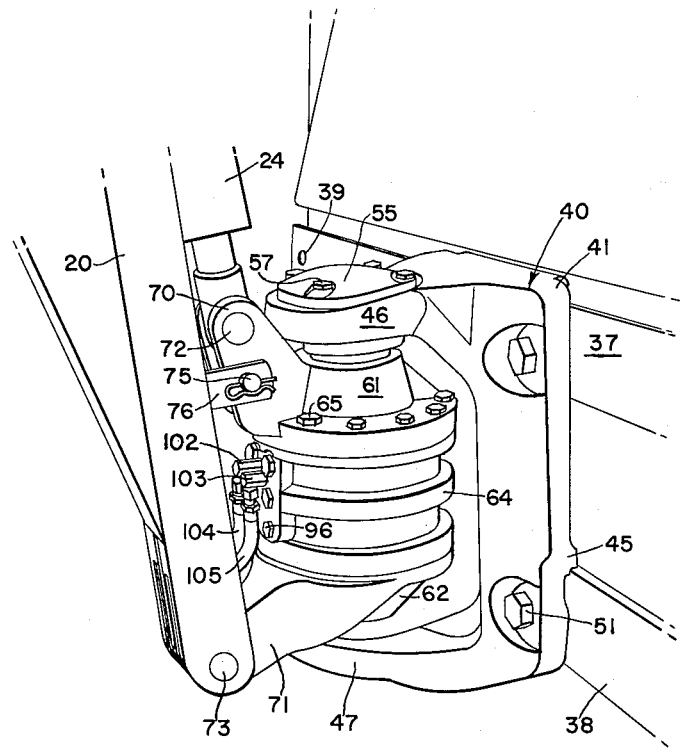
FIG. 2 is a side and rear perspective view of the supporting swivel structure between the boom of the backhoe and its supporting stand.

The earth working implement or backhoe 10 is of the type normally mounted on the rear of the tractor 11 or other type of mobile vehicle. The tractor 11 includes a main power unit or engine, not shown, a body 12 supported on front wheels, also not shown, and a pair of rear traction wheels 13, 14. An operator's station, indicated by its location by the steering wheel 15, is provided on the tractor and includes therein a seat which is reversible and which may be moved into position to either drive the tractor or to operate the controls, as indicated by the levers 16, for operating the backhoe 10.

The backhoe 10 includes a vertically adjustable boom 20 which is basically supported at its lower end by a supporting stand or main frame, indicated in its entirety by the reference numeral 21. The boom 20 is controlled in its vertical movement by an extensible hydraulic unit or cylinder 24. The backhoe 20 also includes a dipper stick 25 pivoted at 26 to the outer end of the boom 20. The dipper stick is swung vertically about the pivot 26 by means of a hydraulic cylinder 27. Pivotally supported at 30 on the outer end of the dipper stick 25 is a bucket 31 which is controlled by a hydraulic cylinder 32. Other types of buckets and earth cutting or moving implements could, of course, be used on the backhoe dipper stick. The hydraulic cylinder 32 is connected to the bucket by means of a roll-over linkage 33. Up to this point description of the backhoe is limited and only generally described, all features and characteristics of such being more or less conventional and well known within the art.

The stand or frame 21 is of the type shown and described in detail in a pending application of John L. French, Albert J. Van Auwelaer, and Douglas C. Agar, Ser. No. 760,266 filed September 10, 1958. The stand 21 includes therein an upright structure supported on transversely spaced legs 35, 36 which engage the ground and generally support the stand 21. Upper and lower track means 37, 38 respectively face rearwardly from the stand structure 21 and have transversely spaced openings 39 across the tracks 37, 38.

A rigid supporting structure 40 is mounted on the tracks 37, 38 of the main stand 21 and includes upper and lower guides 41, 42 which hook behind the respective tracks 37, 38 so as to support the structure 40 in cantilever fashion on the tracks. Pads 43, 44 project forwardly from the rear of the structure 40 and ride against the face of the tracks 37, 38. Also, a forwardly projecting portion 45 overlies the lower track 38. As was explained in detail in the aforementioned application of French et al., the relation of the structure 40 to the tracks 37, 38 permits transverse adjustment of the structure 40 relative to the tractor.

The structure 40 further includes a pair of rearwardly projecting upper and lower support portions 46, 47, each of which have large openings 48, 49. Also provided to further support the structure 40 on the tracks 37, 38 are bolts, such as at 50, 51, on opposite sides of the structure 40 which are received in the openings 39 of the tracks 37, 38. The bolts obviously hold the structure 40 in the desired position on the tracks.

Cap members 55, 56 are positioned in the openings 48, 49 respectively and are detachably connected to the upper and lower support portions 46, 47 by means of bolts 57, 58 respectively. The caps 55, 56 carry thrust bearings 59, 60 respectively which carry upper and lower end portions 61, 62 of an upright casing 63. The casing 63 further includes an upright cylinder portion 64 with an inner periphery spaced radially from the axis formed by the bearings 59, 60. The end portions 61, 62 are rigidly fixed to the cylinder portion 64 by means of bolts 65, 66 respectively. The upper and lower portions 61, 62 of the casing 63 are provided with rearwardly projecting brackets 70, 71. The rearwardly projecting brackets or portions 70, 71 are provided with transverse pivot pins 72, 73 respectively which pivotally connect the hydraulic cylinder 24 and the forward end of the boom 20 to the casing 63. As is obvious, the boom 20 as well as the cylinder 24 therefore may move and be adjusted vertically relative to the casing 63 by adjusting the length of the cylinder 24. The rearwardly projecting bracket 70 is further provided with transverse opening means 74 which receives a pin 75. The boom 20 is provided with a bracket 76 having an opening therein which will register with the opening 74 to receive the pin 75. The bracket 76 and the pin 75 therefore operate as means locking the boom 20 in its vertical uppermost position and serves generally for the purpose of relieving the pressure within the cylinder 24 when the backhoe is in transport position or otherwise not in use.

An upright columnar member or shaft 80 is carried by the lower support means or cap 56 and is held rigidly against rotation by a splined end 81 which is splined to the internal surface of the cap 56. The shaft 80 is supported at its upper and lower end portions in the upper and lower portions 61, 62 of the casing 63, packing means, as at 82, 83, being provided to seal the journals between the portions 61, 62 and the shaft 80 against leakage of fluid. Due to the method of mounting the casing 63 in the upper and lower supports 46, 47 as well as the specific mounting of the shaft 80 relative to the casing 63, it becomes evident that the casing will swivel about a vertical axis relative to both the support 40 as well as the shaft 80.

A first vane means is fixed to the shaft 80 and includes therein a T-shaped vane 85 with the cross bar of the T having an arcuate-shaped section resting against the shaft 80. The vane 85 is fixed to the shaft 80 by means of bolts 87 which are received in suitably tapped openings 88 in the shaft 80. Suitable dowel pins 89 extend between the vane 85 and shaft 80 to add strength to the connection of the vane to the shaft. Suitable openings 90 are provided in the shaft 80 to receive the dowel pins 89. The vane 85 extends the entire height of the fluid chamber within the casing 63 and has its outer peripheral edges engaging the internal surfaces of the end portions 61, 62 and the inner periphery of the cylindrical portion 64. A suitable groove extends around the periphery of the vane 85 and seats a packing ring 91 to seal the edges of the vane 85 against the respective adjacent surfaces.

A second vane member 95 is fixed to the cylindrical portion 64 of the casing by means of bolts 96. The vane 95 is also T-shaped having the cross bar of the T arcuate-shaped to fit adjacent and snugly against the inner periphery of the cylindrical portion 64. The vane 95 extends the height of the chamber formed internally of the casing 63 and has its inner terminal edge adjacent to the columnar member or shaft 80. A peripheral groove is provided around the vane 95 to receive packing 98 which fits against the internal surfaces of the end portions 61, 62, the internal surface of the cylindrical portion 64, and the outer surface of the columnar member 80. As becomes apparent, the vanes 85, 95 divide the fluid chamber formed within the casing 63 into compartments on opposite sides of the vanes.

A pair of L-shaped fluid passageways 100, 101 are provided in the vane member 95 and opens respectively into each of the aforementioned compartments through lower horizontal portions of the passageways. Hydraulic hose couplings 102, 103 are threadedly attached to the cylindrical portion 64 of the casing and open into the fluid passages 100, 101, respectively. The couplings 102, 103 are connected to hydraulic hoses 104, 105 respectively. Fluid is fed through the hoses 104, 105 by conventional type valve means which are controlled by the lever 16 on the main frame 21 of the backhoe. The basic fluid source comes from the tractor 11 also in conventional manner.

The invention operates in the following manner. Fluid is fed into and out of the compartments formed between the vanes 85, 95 through the hydraulic hoses 104, 105, the couplings 102, 103, and the passages 100, 101. Since the shaft or columnar member 80 is fixed against rotation, the casing 63 will move relative to the columnar member 80 as well as the upper and lower supports 46, 47. In order to cause the casing 63 to swing the boom 20 to the left, as viewed from the operator's station, fluid will be introduced through the coupling 102 and fluid will be removed through the coupling 103 to cause the casing 63 to move in a counterclockwise direction (as viewed in FIG. 4) relative to the shaft 80. Likewise, if it is desired to swivel the casing 63 and boom 20 to the right, as viewed from the operator's station, fluid is introduced through the coupling 103 and is removed through the coupling 102 to cause the casing to swivel clockwise relative to the shaft 80.

As may be seen from the drawings, the swiveling action of the casing 63 is basically created by a relatively small structure which is positioned relatively low on the supporting stand 21. The swiveling structure therefore does not create any visibility problem from the operator's station. It is also apparent that the swiveling structure is self-contained and does not require any attachment from the tractor other than the simple coupling between the hoses 104, 105 and the coupling member 102, 103.

While only one form of the invention has been shown, it should be understood that other forms and variations will occur to those skilled in the art. Therefore, while the present description has been shown and described in detail for purposes of clearly and concisely illustrating the principles of the invention, it is not the intention to so limit or narrow the invention beyond the broad general concepts set forth in the appended claims.

What is claimed is:

1. For use in a backhoe in which there is a main supporting frame, a boom member having an end adjacent the frame and carrying earth moving equipment thereon, and an extensible hydraulic unit connected to the boom, the improvement residing in: upper and lower support means fixedly attached to and projecting from the supporting frame; an upright columnar member carried on the support means and fixedly connected to the support means for preventing rotation thereof; a hollow upright casing formed about the columnar support having an upper external surface journaled on said upper support means and an upper internal surface rotatably mounted on the upper portion of the columnar member and a lower external surface journaled on said lower support means and an internal surface rotatably mounted on the lower portion of the columnar member, said casing thereby being adapted to swivel about an upright axis and relative to both the support means and the columnar member, said casing further having an intermediate portion spaced from the columnar member and forming therewith an enclosed annular fluid chamber about the columnar member, said casing further having rigidly projecting upper and lower portions above and below respectively the intermediate portion and terminating relatively close to the intermediate portion, the lower portion being adaptable for pivotal connection to the boom whereby said boom may swing vertically, and the upper portion being adaptable for connection to the extensible hydraulic unit whereby the latter may effect vertical positioning of the boom; a first vane means fixed to the columnar member and disposed within the fluid chamber and having peripheral edges in sealing contact with internal surfaces of the casing; a second vane means fixed to the casing and disposed within the fluid chamber and having peripheral edges in sealing contact with the columnar member, said first and second vane means effecting division of the chamber into a pair of compartments; and valve controlled means for selectively moving fluid to opposite sides of said vane means whereby said casing may be selectively swiveled relative to the columnar support.

2. For use in a backhoe in which there is a main supporting frame, a boom member having an end adjacent the frame and carrying earth moving equipment thereon, and an extensible hydraulic unit connected to the boom, the improvement residing in: upper and lower support means fixedly attached to and projecting from the supporting frame; an upright columnar member carried on the support means and fixedly connected to the support means for preventing rotation thereof; a hollow upright casing formed about the columnar support having an upper internal surface rotatably mounted on the upper portion of the columnar member and a lower internal surface rotatably mounted on the lower portion of the columnar member, said casing thereby being adapted to swivel about the upright axis of the columnar member and relative thereto, said casing further having an intermediate portion spaced from the columnar member and forming therewith an enclosed annular fluid chamber about the columnar member, said casing further having rigid outwardly projecting upper and lower portions above and below respectively the intermediate portion and terminating relatively close to the intermediate portion, the lower portion being adaptable for pivotal connection to the boom whereby said boom may swing vertically, and the upper portion being adaptable for connection to the extensible hydraulic unit whereby the latter may effect vertical positioning of the boom; a first vane means fixed to the columnar member and disposed within the fluid chamber and having peripheral edges in sealing contact with internal surfaces of the casing; a second vane means fixed to the casing and disposed within the fluid chamber and having peripheral edges in sealing contact with the columnar member, said first and second vane means effecting division of the chamber into a pair of compartments; and valve controlled means for selectively moving fluid to opposite sides of said vane means whereby said casing may be selectively swiveled relative to the columnar support.

3. For use in a backhoe in which there is a main supporting frame, a boom member having an end adjacent the frame and carrying earth moving equipment thereon, and an extensible hydraulic unit connected to the boom, the improvement residing in: support means fixedly attached to and projecting from the supporting frame; an upright columnar member carried on the support means and fixedly connected to the support means for preventing rotation thereof; a hollow upright casing formed about the columnar support having an upper end with an internal surface rotatably mounted on the upper portion of the columnar member and a lower end with an internal surface rotatably mounted on the lower portion of the columnar member, said casing thereby being adapted to swivel about the upright axis of the columnar member and relative thereto, said casing further having an intermediate portion spaced from the columnar member and forming therewith an enclosed annular fluid chamber about the columnar member; upper and lower pivotal connecting means on the upper and lower end respectively of the casing, one of the pivotal connecting means being adaptable for connection to the boom whereby said boom may swing vertically about the respective end of the casing, and the other pivotal connecting means being adaptable for connection to the extensible hydraulic unit whereby the latter may effect vertical positioning of the boom; a first vane means fixed against movement and disposed within the fluid chamber and having peripheral edges in sealing contact with internal surfaces of the casing; a second vane means fixed to the casing and disposed within the fluid chamber and having peripheral edges in sealing contact with the columnar member; and valve controlled means for selectively moving fluid to opposite sides of said vane means whereby said casing may be selectively swiveled relative to the columnar support.

4. For use in a backhoe in which there is a main supporting frame, a boom member having an end adjacent the frame and carrying earth moving equipment thereon, and an extensible hydraulic unit connected thereto, the improvement residing in: upper and lower support means fixedly attached to and projecting from the supporting frame and including a rigidly attached upright member; a hollow upright casing formed about the upright member and closed at its upper and lower ends, said casing having an upper external surface journaled on said upper support means and a lower external surface journaled on said lower support means, said casing thereby being adapted to swivel about an upright axis and relative to the support means, said casing having an enlarged intermediate portion with an internal enclosed fluid chamber, said casing further having radial structure rigid with and on its outer surface defining a pair of vertically spaced horizontal pivots; means on the end of the boom adjacent the frame for mounting the boom on one of the horizontal pivots whereby said boom may swing vertically, and means on the hydraulic unit for mounting the latter on the other of the horizontal pivots whereby the hydraulic unit may effect vertical positioning of the boom; a first vane means fixed to the upright member and disposed within the fluid chamber and having peripheral edges in sealing contact with the casing; a second vane means fixed to the casing and disposed within the fluid chamber and having peripheral edges in sealing contact with the upright member, said first and second vane means effecting division of the chamber into a pair of fluid compartments; inlet and outlet means opening into said compartments and valve controlled means for selectively moving fluid through said inlet and outlet means to effect movement of the casing about its upright axis.

5. For use in a backhoe in which there is a main supporting frame, a boom member having an end adjacent the frame and carrying earth moving equipment thereon, and an extensible hydraulic unit connected thereto, the improvement residing in: support means fixedly attached to and projecting from the supporting frame and including a rigidly attached upright member; a hollow upright casing formed about the upright member and closed at its upper and lower ends, said casing being journaled on said support means to swivel about an upright axis and relative to the support means, said casing having an enlarged intermediate portion with an internal enclosed fluid chamber, said casing further having rigidly projecting portions, one of the portions being adaptable for pivotal connection to the boom whereby said boom may swing vertically, and the other portion being adaptable for connection to the extensible hydraulic unit whereby the latter may effect vertical positioning of the boom; vane means including at least one upright vane fixed to the casing and disposed within the fluid chamber, said vane means effecting division of the chamber into expandable compartments; fluid inlet and outlet means opening into said compartments and valve controlled means for selectively moving fluid through said inlet and outlet means to effect movement of the casing about its upright axis.

6. The invention defined in claim 5 in which the upright member is a shaft concentric with the casing and fixed to the support.

7. The invention defined in claim 5 further characterized by the rigidly projecting portions on the casing having means thereon for rigidly securing the boom against vertical movement.

References Cited in the file of this patent
UNITED STATES PATENTS 2,648,449     Hoover _____ Aug. 11, 1953
2,834,489     Davis _____ May 13, 1958